United States Patent [19]
Grondin et al.

[11] Patent Number: 5,905,110
[45] Date of Patent: May 18, 1999

[54] COPOLYMER DISPERSANTS FOR PROVIDING IMPROVED WATER RESISTANCE TO FILLED AND/OR PIGMENTED FILMS

[75] Inventors: Henri Grondin, Sathonay Village; Jean-Bernard Egraz, Ecully; Jean-Marc Suau, Lucenay, all of France

[73] Assignee: Coatex, S.A., Genay Cedex, France

[21] Appl. No.: 08/628,112

[22] Filed: Apr. 9, 1996

[30] Foreign Application Priority Data

Apr. 10, 1995 [FR] France .................................. 95 04487

[51] Int. Cl.$^6$ ........................................................ C08K 3/00
[52] U.S. Cl. ............................................. 524/556; 526/318.45
[58] Field of Search ......................... 526/318.45; 524/556

[56] References Cited

U.S. PATENT DOCUMENTS

| | | | |
|---|---|---|---|
| 3,980,602 | 9/1976 | Jakubauskas | 260/29.6 TA |
| 4,245,074 | 1/1981 | Buter | 526/214 |
| 4,460,732 | 7/1984 | Buscall et al. | 524/460 |
| 5,432,239 | 7/1995 | Egraz et al. | 525/330.2 |

FOREIGN PATENT DOCUMENTS

| | | |
|---|---|---|
| 0 099 179 | 1/1984 | European Pat. Off. . |
| 0 364 328 | 4/1990 | European Pat. Off. . |
| 0 542 644 | 5/1993 | European Pat. Off. . |
| 63-120196 | 5/1988 | Japan . |
| 3281675 | 12/1991 | Japan . |
| 0762160 | 11/1956 | United Kingdom . |

OTHER PUBLICATIONS

Database WPI, Derwent Publications, AN–88–180924, JP–A–63 120 196, May 24, 1988.

*Primary Examiner*—Bernard Lipman
*Attorney, Agent, or Firm*—Oblon, Spivak, McClelland, Maier & Neustadt, P.C.

[57] ABSTRACT

Copolymer dispersants for use in an aqueous emulsion containing fillers pigments or both where the copolymer has the formula (I)

$$-(A)_a-(B)_b-(C)_c- \qquad (I)$$

wherein
  A represents units resulting from acrylic or methacrylic acid monomers,
  B represents units resulting from styrene monomers or a derivative thereof,
  C represents units resulting from $C_1$–$C_4$ alkyl acrylate or methacrylate monomers,
  a, b and c represent the percentages by weight of A, B and C, respectively with respect to total weight of the monomers,
  wherein the copolymer yields a homogeneous solution which is clear to cloudy in a medium of neutral or alkaline pH and wherein the copolymer has a specific viscosity of less than or equal to 15, which imparts increased water resistance to dry or drying films made from aqeuous emulsion compositions containing the copolymer dispersant. The resulting aqueous compositions are useful as textured coatings, coatings, aqueous paints and coating compositions.

14 Claims, No Drawings

COPOLYMER DISPERSANTS FOR PROVIDING IMPROVED WATER RESISTANCE TO FILLED AND/OR PIGMENTED FILMS

BACKGROUND OF THE INVENTION

1. Field of the Invention

The present invention relates to copolymer dispersants useful for dispersing for aqueous media of mineral fillers and/or mineral pigments which-increase the water resistance of dried or drying films made from filled and/or pigmented aqueous compositions, and the filled and/or pigmented aqueous compositions containing the dispersant.

2. Discussion of the Background

Until now, the water-soluble dispersants used for deflocculation in formulations based on pigments or fillers have been subdivided into two different families:

The first family consists of low-molecular-weight acrylic dispersants obtained by radical polymerization in solution, whose principal advantages are a high dispersing effectiveness, exhibited in the ability to prepare a paste using moderate mechanical energy, in which the paste consists of large quantities of mineral pigments and/or mineral fillers in a small volume of water containing the dispersant, and providing good stability of the viscosity of the formulation obtained, both over time and with respect to temperature. These dispersants have a major drawback in their strong hydrophilicity, leading to formulations having a great sensitivity to water during and after drying. This phenomenon is demonstrated particularly in paint formulations by the tests of resistance to wet abrasion conducted on dry films (DIN 53778) and the test of atomization of water on a freshly applied film.

The second family consists of vinyl based dispersants obtained by radical polymerization among which the best known compounds are the diisobutylene-maleic anhydride copolymers, which during drying and after drying impart improved water resistance to the formulations. This is seen notably in paints by the tests of resistance to wet abrasion on a dry film (DIN 53778) and the test of atomization of water on a freshly applied film. These dispersants also have major drawbacks however in exhibiting mediocre dispersing effectiveness and poor rheological stability of the resulting formulations both over time and with respect to temperature.

Until now a person skilled in the art has always confronted the problem of having available only compositions which are not completely satisfactory. Thus the filled and/or pigmented aqueous compositions previously available which are stable over time and with respect to different temperature, form films which when applied as a coating have a great sensitivity to water during and after drying. This leads to various consequences, including either poor washability with regard to interior coatings or poor resistance to weathering, especially to rainfall, which develops early after their application as exterior coatings. This can be observed, for example, by the washing off of thin films, such as mat exterior films. Moreover a person skilled in the art today also has filled and/or pigmented aqueous compositions whose films when applied as a coating are relatively insensitive to water but whose rheologies are unstable over time and with respect to temperature This is seen essentially in an increase of the Brookfield viscosities. This has the drawback that it changes the characteristics of film application such as loading of the roller or the brush. The levelling of the paint results in difficulties of application to the support great difficulty in mixing these paints homogeneously with the pigmented pastes required to achieve the final hue or in impossibility of removing the paint from its packaging due to the fact that it has gelled.

SUMMARY OF THE INVENTION

Accordingly one object of the present invention is to provide a copolymer for use in aqueous and/or pigmented aqueous compositions obtained by radical polymerization in an aqueous emulsion which has a good dispersing effectiveness and results in formulations with low water sensitivity and good rheological stability both over time and with respect to temperature.

A further object of the present invention is to provide filled and/or pigmented aqueous compositions containing 0.1–0.08 wt % by dry weight preferably 0.1–0.5 wt %, with respect to the total dry weight of the mineral fillers and pigments contained in the aqueous compositions of the above dispersing copolymer such as for example interior mat paints and exterior paints for waterproofing or coatings or textured coatings or any composition containing a high content of mineral filler and/or pigment that is containing similar quantities below and above the maximum quantities of pigments and/or fillers which the binder present in the composition is capable of coating.

These and other objects of the present invention have been satisfied by the discovery of a copolymer manufactured in an aqueous emulsion with a specific viscosity of less than or equal to 15 which produces a homogeneous solution which is clear to cloudy in a neutral or alkaline medium the copolymer having the general formula (I):

(I)

in which

A represents units resulting from acrylic or methacrylic acid,

B represents units resulting from styrene or a derivative thereof such as α-methylstyrene or vinyltoluene, C represents units resulting from $C_1$–$C_4$ alkyl acrylates or methacrylates, a represents the percentage by weight of the monomer A, with respect to the total weight of the monomers, and a is a value from 40 to 60, b represents the percentage by weight of the monomer B, with respect to the total weight of the monomers, and b is a value from 25 to 45, c represents the percentage by weight of the monomer C, with respect to the total weight of the monomers and c is a value from 0 to 20, wherein the copolymer imparts increased water resistance to filled and/or pigmented compositions while at the same time maintaining a very good dispersing effects.

DETAILED DESCRIPTION OF THE PREFERRED EMBODIMENTS

The present invention relates to a copolymer dispersant for imparting water resistance comprising a copolymer having the general formula (I):

(I)

wherein
- A represents units resulting from acrylic or methacrylic acid,
- B represents units resulting from styrene or a derivative thereof such as α-methylstyrene or vinyltoluene,
- C represents units resulting from $C_1$–$C_4$ alkyl acrylates or methacrylates,
- a represents the percentage by weight of the monomer A with respect to the total weight of the monomers, and a is a value from 40 to 60,
- b represents the percentage by weight of the monomer B, with respect to the total weight of the monomers, and b is a value from 25 to 45,
- c represents the percentage by weight of the monomer C with respect to the total weight of the monomers, and c is a value from 0 to 20, The present copolymers result from the copolymerization of at least two monomer units (A and B) defined above according to conventional methods of direct emulsion radical polymerization in the presence of initiators, such as peroxides and per salts. Suitable initiators include hydrogen peroxide, t-butyl hydroperoxide, and sodium, potassium, and ammonium persulfates. Reducing agents such as sodium hypophosphite, hypophosphorus acid and sodium metabisulfite can also be present, as well as appropriate molecular weight regulators, such as alkyl mercaptans (including octanethiol, decanethiol, n-dodecanethiol, t-dodecyl mercaptan, mercaptoacetic acid, mercaptopropionic acid, mercaptovaleric acid, mercaptobenzoic acid, mercaptosuccinic acid or mercaptoisophthalic acid or their alkyl esters).

As soon as the polymerization is completed, the acid copolymers in the aqueous emulsion are collected and they can, according to the invention, be used as is or in a partially neutralized form, provided that they are neutralized in situ in the formulation by an alkaline compound present in the formulation and before the introduction of fillers and/or pigments.

The acid copolymers can also be completely neutralized by neutralizing agents, such as potassium hydroxide, sodium hydroxide or ammonia, and used in the completely neutralized form. Neutralization can be accompanied by a partial or complete hydrolysis of the acrylic or methacrylic ester.

The copolymer dispersants of the present invention impart increased water resistance to dry or drying films and yield a homogeneous solution which is clear to cloudy in a neutral or alkaline medium and have a specific viscosity equal to or less than 15.

The specific viscosity "$\eta$" of the present copolymers is determined as follows:

A solution of copolymer in the form of a sodium salt is prepared by the dissolution of 20 g of dry copolymer in 1 L of a solvent consisting of a water-tetrahydrofuran mixture in a ratio by volume of 1:1.

Then using a Ubbelohde capillary viscosimeter with constant k=0.01 cSt/sec and with a measuring limit of 1.2–10 cSt, which is placed in a bath which is regulated by thermostat at 25° C. the flow time is measured for a given volume of the above-mentioned solution containing the alkaline copolymer as well as the flow time of the same volume of solvent without said copolymer. It is then possible to define the specific viscosity "$\eta$" using the following equation:

$$\eta=[(\text{Flow time of the solution of copolymer})-(\text{Flow time of the solvent})]/((\text{Flow time of the solvent}))$$

The quantity of the copolymer dispersant used in the filled and/or pigmented formulations according to the present invention used to impart water resistance to dry or drying films is from 0.1 to 0.8 wt % by dry weight preferably 0.1 to 0.5 wt % by dry weight, of the copolymer with respect to the total dry weight of the mineral fillers and pigments contained in the filled and/or pigmented aqueous compositions.

The invention also relates to filled and/or pigmented aqueous compositions containing the dispersant copolymer of the present invention. These filled and/or pigmented aqueous compositions of the present invention, contain as principal constituents (a) water, (b) mineral fillers and/or pigments, such as natural or synthetic calcium carbonate, magnesium carbonate, zinc carbonate, mixed magnesium and calcium salts such as dolomites, limestone, magnesia, barium sulfate, calcium sulfate, magnesium hydroxides, aluminum hydroxides, silica, wollastonite, clays and other silicoaluminous compounds such as kaolins, silicomagnesia compounds such as talc, mica, metallic oxides such as, for example, zinc oxide, iron oxides, titanium oxide, (c) one or more natural or synthetic binders, (d) the copolymer dispersing agent of the present invention, and, optionally, (e) conventional adjuvants, such as coalescing agents, thickeners, biocides, surfactants, antifoaming agents and others.

The filled and/or pigmented aqueous compositions, according to the present invention, are highly filled and/or pigmented aqueous coating compositions. These aqueous compositions are useful as coating compositions, including the paper coating colors or coating compositions for textiles, textured coatings, renderings, aqueous paints and more particularly interior mat aqueous paints and exterior aqueous paints for waterproofing.

Having generally described this invention a further understanding can be obtained by reference to certain specific examples which are provided herein for purposes of illustration only and are not intended to be limiting unless otherwise specified.

EXAMPLES

Example 1

This example concerns the use of various dispersants in an interior mat aqueous paint to evaluate their dispersing effectiveness and their capacity to increase the water resistance of dry films. Specifically the rheological stability and the water resistance of the various interior mat paints was obtained.

For all the tests with the exception of the control test 0.12 wt % by dry weight of the dispersant tested with respect to the total weight of the same mat aqueous paint formulation was added with stirring to a container which already contained 160 g water and 1 g of 28% ammonia.

After a few seconds of stirring and after the introduction of the above dispersing copolymer in aqueous ammonia the other constituents of the mat aqueous paint were added as follows:

- 2 g of a biocide marketed by the company RIEDEL DE HAEN under the name HERGAL K6N
- 1 g of an antifoaming agent marketed by the company BYK under the name BYK 034
- 41 g of rutile marketed by the company THANN and MULHOUSE under the name RL 68
- 327.9 g of natural calcium carbonate marketed by the company OMYA under the name DURCAL 2
- 215.2 g of natural calcium carbonate marketed by the company OMYA under the name HYDROCARB 82 g of a styrene-acrylic binder in a dispersion, marketed by the company RHÔNE-POULENC under the name RHODOPAS DS 910

10.2 g of monoethylene glycol 10.2 g of White Spirit 1.3 g of 28% ammonia 13.6 g of a thickener marketed by COATEX under the name VISCOATEX 46 and water to bring the total weight to 1,000 g.

The various dispersants tested were:

Test No. 1

This test was a control test in which no dispersing agent was added.

Test No. 2

This test illustrated the prior art and used a polyacrylic acid which was neutralized completely by sodium hydroxide and sold by COATEX under the name COATEX P50.

Test No. 3

This test illustrated the prior art and used a diisobutylene-maleic anhydride copolymer which was neutralized completely by sodium hydroxide and sold by the company ROHM & HAAS under the name OROTAN 731.

Test No. 4

This test illustrated the prior art and used a diisobutylene-maleic anhydride copolymer which was completely neutralized by sodium hydroxide and sold by the company RHÔNE-POULENC under the name SOPROPHOR T36.

Test No. 5

This test illustrated the present inventions and used a dispersant with a specific viscosity equal to 12 and consisting of:

44.0 wt % of units from methacrylic acid 40.5 wt % of units from styrene 15.5 wt % of units from butyl acrylate.

Test No. 6

This test illustrated the present invention and used a dispersant with the same monomer composition as that of Test No. 5, but with a specific viscosity of 0.22.

Test No. 7

This test illustrated the present invention, and used a dispersant with the same monomer composition as that of Test No 5, but with a specific viscosity of 0.15.

Test No. 8

This test illustrated the present invention and used a dispersant with a specific viscosity of 0.20, and consisting of:

50.0 wt % of units from methacrylic acid 36.3 wt % of units from styrene 13.7 wt % of units from butyl methacrylate saponified by potassium hydroxide at the end of the polymerization.

Test No. 9

This test illustrated the present invention and used a dispersant with a specific viscosity of 0.45, and consisting of:

50.0 wt % of units from methacrylic acid 36.3 wt % of units from styrene 13.7 wt % of units from butyl acrylate.

Test No. 10

This test illustrated the present invention and used a dispersant with the same monomer composition as that of Test No. 9, but with a specific viscosity of 0.23.

Test No. 11

This test illustrated the present invention and used a dispersant with a specific viscosity of 0.48 and consisting of:

50.0 wt % of units from methacrylic acid 32.6 wt % of units from styrene 12.4 wt % of units from butyl acrylate.

Test No. 12

This test illustrated the present inventions and used a dispersant with a specific viscosity of 0.23, and consisting of:

60.0 wt % of units from methacrylic acid 29.0 wt % of units from styrene 11.0 wt % of units from butyl acrylate.

For each one of the preceding tests after a few minutes of stirring of the aqueous composition so prepared the Brookfield viscosities of the different compositions were measured at 25° C., at 10 rpm using a Brookfield viscometer of the RVT type equipped with the appropriate spindle.

The Theological stability of the formulations over time and with respect to temperature was determined by measurement of the Brookfield viscosities at 10 rpm and at 25° C. after a storage period of 24 h without stirring at ambient temperature then after storage of one week in an oven at 50° C. and finally after one-month storage in the same oven at 50° C.

During the preparation of the compositions of the preceding tests, the dimension of the vortex present around the axis of agitation was also evaluated visually throughout the addition of the mineral fillers and/or pigments and of various additives, to estimate the ease of dispersing process with the composition, where ease of paste formation is an indicator of the dispersing effectiveness.

Table I summarizes all the results obtained for the different tests. The following is recorded in the column entitled facility for dispersing process:

TB: when the vortex maintained a constant dimension and a constant shape throughout incorporation of the mineral fillers and/or pigments, thus reflecting a very good fluidity of the composition obtained, B: when the dimension of the vortex changed slightly during the course of incorporation of the mineral fillers and/or pigments, AB: when the vortex became very small during incorporation of the mineral fillers and/or pigments, but nevertheless allowed a homogenization of the different components of the formulation.

The notation H used for the control test means that the vortex around the stirring axis completely disappeared thus causing poor homogenization of the medium.

The rheological behavior of the various interior mat paints having thus been measured tests of resistance to wet abrasion on a dry film according to the standard DIN 53778, part No. 2, were conducted.

This test consisted in determining using a GARDNER model M 105-A abrasion tester (certified DIN 53778) the number of back-and-forth motions made by a brush calibrated according to the standard DIN 53778e by rubbing on a film of paint which has first been dried on a LENETA card and which has a thickness of 100 $\mu$m in the presence of a detergent solution to completely abrade the film of paint.

All of these results are summarized in the following Table I:

195.0 g of rutile marketed by the company TIOXIDE under the name TR 92

TABLE I

|  | Test No. | Dry Dispersant (wt %) | Brookfield Viscosities of the Paint | | | | Ease of Dispersing Process | Resistance to Wet Abrasion; Number of Back-and-Forth Motions (DIN 53778) |
| --- | --- | --- | --- | --- | --- | --- | --- | --- |
|  |  |  | T = 0 10 pm (mPa · sec) | T = 24 h 10 rpm (mPa · sec) | T = 1 week 50° C. 10 rpm (mPa · sec) | T = 1 month 50° C. 10 rpm (mPa · sec) |  |  |
| CONTROL | 1 | 0 | 21000 | 34000 | 66000 | 68000 | M | 500 |
| PRIOR ART | 2 | 0.12 | 11000 | 10000 | 10000 | 10000 | TB | 240 |
|  | 3 | 0.12 | 16500 | 27000 | 80000 | 80000 | AB | 950 |
|  | 4 | 0.12 | 17000 | 32000 | 70000 | 70000 | AB | 750 |
| INVENTION | 5 | 0.12 | 17500 | 18000 | 48000 | 48000 | AB | 1050 |
|  | 6 | 0.12 | 19000 | 21000 | 47000 | 47000 | AB | 1010 |
|  | 7 | 0.12 | 21000 | 21000 | 48000 | 48000 | AB | 1230 |
|  | 8 | 0.12 | 16000 | 21000 | 56000 | 57000 | TB | 1410 |
|  | 9 | 0.12 | 20000 | 21000 | 49000 | 56000 | TB | 1290 |
|  | 10 | 0.12 | 15000 | 17000 | 31000 | 36000 | TB | 1300 |
|  | 11 | 0.12 | 16000 | 18000 | 44000 | 42000 | TB | 1090 |
|  | 12 | 0.12 | 17000 | 18000 | 44000 | 50000 | TB | 1260 |

Table I allows the observation that only the aqueous paints according to the present invention give simultaneously good Theological stability as indicated by a Brookfield viscosity at 10 rpm and at 25° C. of less than 60,000 mPa.sec ease of dispersing process which is at least fairly good (AB) and good resistance to wet abrasions which is increased and appropriate for use as indicated by the ability to resist 1,000 back-and-forth motions of the brush on the film of paint this value of 1,000 back-and-forth motions corresponding to a washable paint quality according to DIN 53778.

Example 2

This example concerned the use of various dispersants in an exterior aqueous paint for waterproofing to evaluate their dispersing effectiveness and their capacity to increase the water resistance of films during the course of drying. This example is equivalent to evaluating the rheological stability and the water resistance of the various exterior aqueous paints by a water atomization test which simulates rainfall.

For all the tests, with the exception of the control test 0.20 wt % by dry weight of the dispersant tested was added with respect to the total weight of the exterior paint formulation in a container which already contained 62.3 g of water and 2 g of an antifoaming agent marketed by the company BYK under the name BYK 033.

After a few seconds of stirring the other constituents of the exterior paint were added successively as follows:

9 g of a bactericide-fungicide marketed by the laboratories PHAGOGENE under the name PARMETOL DF 18

5.5 g of a polyurethane thickener marketed by the company COATEX under the name COATEX BR125 P 1.5 g of an alkanolamine sold by the company ANGUS under the name AMP 90

29.0 g of propylene glycol 18.9 g of mica marketed by the company COMPTOIR DE MINÉRAUX ET MATIERES PREMIÈRES under the name MU2/1

75.5 g of barium sulfate marketed by the company SACHTLEBEN CHEMIE under the name BLANC FIXE MICRO 74.0 g of talc marketed by the company TALC DE LUZENAC under the name TALC 20M 350.0 g of a latex marketed by the company ROHM & HAAS under the name PRIMAL EP 5231

69.2 of a plastic pigment marketed by the company ROHM & HAAS under the name ROPAQUE OP 62

2.0 g of an antifoaming agent marketed by the company BYK under the name BYK 033

9.8 g of a surfactant of the nonylphenol type oxyethylenated 30 times 2.0 g of a bactericidal biocide marketed by the company PROGIVEN under the name BIOCIDE Klo 5.6 g of a thickener marketed by the company ROHM & HAAS under the name ACRYSOL TT 615

10.0 g of a plasticizer based on tributyl phosphate with the remainder being enough water to total 1000 g.

The various dispersants tested were:

Test No. 13

This test was the control test in which no dispersing agent was added.

Test No. 14

This test illustrated the prior art and used a polyacrylic acid which had been completely neutralized by sodium hydroxide which is sold by COATEX under the name COATEX P 50.

Test No. 15

This test illustrated the prior art and used a diisobutylene-maleic anhydride copolymer which had been completely neutralized by sodium hydroxide and which is sold by the company ROHM & HAAS under the name OROTAN 731.

Test No. 16

This test illustrated the prior art and it used a diisobutylene-maleic anhydride copolymer which had been completely neutralized by sodium hydroxide and is sold by the company RHÔNE-POULENC under the name SOPROPHOR T36.

Test No. 17

This test illustrated the present invention, and used the same copolymer as that of Test No. 5.

Test No. 18

This test illustrated the present invention, and used the same copolymer as that of Test No. 6.

Test No. 19

This test illustrated the present invention, and used the same copolymer as that of Test No. 7.

Test No. 20

This test illustrated the present invention, and used the same copolymer as that of Test No. 8.

Test No. 21

This test illustrated the present invention, and used the same copolymer as that of Test No. 9.

Test No. 22

This test illustrated the present invention, and used the same copolymer as that of Test No. 10.

Test No. 23

This test illustrated the present invention, and used the same copolymer as that of Test No. 11.

After the different paints were prepared in this manner, the Brookfield viscosities were measured at 10 rpm and 100 rpm, each at 25° C., and the ease of dispersing process for these different tests was estimated using the same apparatus as described in Example 1.

The water resistance, notably the resistance to early rainfall occurring during drying of the exterior aqueous paint, was determined by the test of atomization of water on a freshly applied film.

This test consists in atomizing approximately 150 mL water for 2 min over 500 cm² of a film of paint applied one-half hour earlier with a brush in the amount of 200 g/m² under humid conditions over half of a LENETA contrast card placed vertically and observing any flat edge formation on the lower part of the unpainted LENETA card, with the entire test being conducted under fixed conditions of temperature and hygrometry.

The test was evaluated as positive (recorded P in the following Table II) if no flat edge formation was observed on the unpainted part of the LENETA card.

The evaluation was acceptable (recorded as A in the following Table II) if there were a few cases of flat edge formation on the unpainted part of the LENETA card and if no zone of the painted part of the LENETA card presented any completely apparent pattern.

Finally the test was evaluated as negative (recorded N in the following Table II) if flat edge formations of paint appeared on the unpainted part of the LENETA card and if zones of the painted part of the LENETA card presented completely apparent patterns.

All the results of the above-mentioned measurements are listed in the following Table II.

Table II shows that only the exterior aqueous paints according to the present invention simultaneously exhibit good water resistance (recorded A or P) and good rheological stability; that is they have after one month of storage in an oven at 50° C. Brookfield viscosities at 10 rpm and at 25° C. of less than 55,000 mPa.sec and at 100 rpm and at 25° C. of less than 16,000 mPa.sec.

This application is based on French Patent Application 95-04487 filed with the French Patent Office on Apr. 10, 1995, the entire contents of which are hereby incorporated by reference Obviously additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An aqueous composition comprising:

a dispersant amount of a copolymer dispersant having the formula (I):

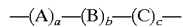

wherein

A represents units resulting from acrylic or methacrylic acid monomers,

B represents units resulting from styrene monomers or a derivative thereof,

C represents units resulting from $C_1$–$C_4$ alkyl acrylate or methacrylate monomers, a represents the percentage by weight of A, with respect to total weight of the monomers, and is a value from 40 to 60, b represents the percentage by weight of B, with respect to total weight of the monomers, and is a value from 25 to 45, c represents the percentage by weight of C, with respect to total weight of the monomers, and is a value from 0 to 20, wherein said copolymer is unneutralized or is completely or partially neutralized with sodium, potassium, or ammonia,

TABLE II

| | Test No. | Dry Dispersant (wt %) | Brookfield Viscosities of the Paint | | | | Ease of Dispersing Process | Atomization of Water on Freshly Applied Film |
| --- | --- | --- | --- | --- | --- | --- | --- | --- |
| | | | T = 0 10 rpm– 100 rpm (mPa · sec) | T = 24 h 10 rpm– 100 rpm (mPa · sec) | T = 1 week 50° C. 10 rpm– 100 rpm (mPa · sec) | T = 1 month 50° C. 10 rpm– 100 rpm (mPa · sec) | | |
| CONTROL | 13 | 0 | 22000/7300 | 43000/16800 | 56000/18000 | 56000/18400 | AB | (P) |
| PRIOR ART | 14 | 0.20 | 14000/4300 | 24000/8400 | 23000/7600 | 26000/8000 | B | (N) |
| | 15 | 0.20 | 18000/5700 | 44000/14800 | 68000/17200 | 66000/17600 | AB | (P) |
| | 16 | 0.20 | 16000/5600 | 40000/14000 | 56000/16000 | 56000/16400 | AB | (P) |
| INVENTION | 17 | 0.20 | 22000/7200 | 38000/12000 | 46000/13600 | 46000/13600 | AB | (P) |
| | 18 | 0.20 | 17000/5600 | 28000/9600 | 34000/10800 | 44000/14000 | AB | (P) |
| | 19 | 0.20 | 22000/6400 | 34000/11200 | 52000/15200 | 54000/15200 | AB | (A) |
| | 20 | 0.20 | 16000/5600 | 24000/8800 | 22000/7600 | 22000/8000 | AB | (A) |
| | 21 | 0.20 | 22000/7600 | 36000/11200 | 40000/13200 | 40000/12800 | B | (P) |
| | 22 | 0.20 | 22000/7400 | 28000/9200 | 34000/11600 | 32000/10000 | AB | (A) |
| | 23 | 0.20 | 24000/7600 | 28000/9200 | 40000/15200 | 38000/12400 | B | (A) | wherein said copolymer yields a homogeneous solution, which is clear to cloudy in a medium of neutral or alkaline pH and wherein said copolymer has a specific viscosity of less than or equal to 15;

one or more mineral fillers or pigments or both dispersed therein; and water, and wherein a film of said composition resists at least 1,000 back-and-forth motions according to standard DIN 53778.

2. The aqueous composition according to claim 1, wherein the aqueous composition is a member selected from the group consisting of aqueous paints renderings textured coatings and coating compositions.

3. The aqueous composition according to claim 2, wherein the aqueous composition is a member selected from the group consisting of interior mat aqueous paints and exterior aqueous paints for waterproofing.

4. The aqueous composition according to claim 1, wherein said copolymer is present in an amount of from 0.1 to 0.8 wt % by dry weight with respect to total dry weight of said one or more fillers pigments or both contained therein.

5. The aqueous composition according to claim 1, wherein the composition is an interior mat aqueous paint.

6. The aqueous composition according to claim 1, wherein the composition is an exterior aqueous paint for waterproofing.

7. The aqueous composition according to claim 1, wherein said one or more fillers pigments or both are members selected from the group consisting of natural calcium carbonate synthetic calcium carbonate magnesium carbonate zinc carbonate mixed magnesium and calcium salts limestone magnesia barium sulfate calcium sulfate magnesium hydroxides aluminum hydroxides silica wollastonite clays and other silicoaluminous compounds silicomagnesia compounds, mica and metallic oxides.

8. The aqueous composition according to claim 1, further comprising one or more natural or synthetic binders.

9. The aqueous composition according to claim 1, further comprising one or more conventional adjuvants selected from the group consisting of coalescing agents thickeners biocides surfactants and antifoaming agents.

10. The aqueous composition according to claim 1, wherein the copolymer has been at least partially neutralized in situ using an alkaline neutralizing agent.

11. The aqueous composition according to claim 10, wherein said copolymer has been completely neutralized by said alkaline neutralizing agent.

12. The aqueous composition according to claim 10, wherein said alkaline neutralizing agent is a member selected from the group consisting of potassium hydroxide sodium hydroxide and ammonia.

13. The aqueous composition according to claim 4, wherein said copolymer is present in an amount of from 0.1 to 0.5 wt % by dry weight with respect to total dry weight of said one or more fillers pigments or both contained therein.

14. A method of dispersing one or more mineral fillers or mineral pigments or both in an aqueous composition comprising same, which comprises including in said composition a dispersant amount of a copolymer dispersant having the formula (I):

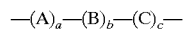

wherein

A represents units resulting from acrylic or methacrylic acid monomers,

B represents units resulting from styrene monomers or a derivative thereof,

C represents units resulting from $C_1$–$C_4$ alkyl acrylate or methacrylate monomers, a represents the percentage by weight of A, with respect to total weight of the monomers, and is a value from 40 to 60, b represents the percentage by weight of B, with respect to total weight of the monomers, and is a value from 25 to 45, c represents the percentage by weight of C, with respect to total weight of the monomers, and is a value from 0 to 20, wherein said copolymer is unneutralized or is completely or partially neutralized with sodium potassium, or ammonia, wherein said copolymer yields a homogeneous solution, which is clear to cloudy in a medium of neutral or alkaline pH, and wherein said copolymer has a specific viscosity of less than or equal to 15, and wherein a film of said composition resists at least 1,000 back-and-forth motions according to standard DIN 53778.

* * * * *